United States Patent [19]

Nakanishi et al.

[11] Patent Number: 4,824,717

[45] Date of Patent: Apr. 25, 1989

[54] MESH SCREEN OF POLYESTER FILAMENTS FOR SCREEN PRINTING

[75] Inventors: Toru Nakanishi; Shigehiro Hoshida; Susumu Ueno, all of Ibaraki, Japan

[73] Assignee: Shin-Etsu Chemical Co., Ltd., Tokyo, Japan

[21] Appl. No.: 137,321

[22] Filed: Dec. 23, 1987

[30] Foreign Application Priority Data

Jan. 7, 1987 [JP] Japan .................................... 62-1448
Jan. 7, 1987 [JP] Japan .................................... 62-1449

[51] Int. Cl.$^4$ ............................................. B32B 7/00
[52] U.S. Cl. .................................. 428/255; 427/271; 427/275; 427/276; 427/422; 428/265; 428/378; 428/395; 428/400; 428/409
[58] Field of Search ............... 428/224, 255, 265, 378, 428/395, 400, 409; 427/271, 275, 276, 422

[56] References Cited

U.S. PATENT DOCUMENTS 4,756,946 7/1988 Mercer ................................ 428/255

Primary Examiner—Marion C. McCamish
Attorney, Agent, or Firm—Wenderoth, Lind & Ponack

[57] ABSTRACT

A mesh screen of polyester filaments for screen printing is subjected to a treatment with low temperature plasma in an atmosphere of a non-oxidizing inorganic gas to such an extent that a crosslinked layer having a thickness of 0.001 to 0.1 µm is formed on the surface of the polyester filaments and the surface of the filaments is provided with protrusions and concavities having a diameter of 0.01 to 0.1 µm in a distribution density of 1000 to 6000 per µm$^2$ of the surface area of the filament. The thus treated mesh screen is advantageously improved, with no adverse influences on the mechanical strength, in respect of the adhesion between the filament surface and a photosensitive resin composition applied to the mesh screen for photolithographic patterning. The plasmatreated mesh screen is also advantageous in respect of the decreased resistance against transfer of a printing ink through open meshes.

2 Claims, 1 Drawing Sheet

MESH SCREEN OF POLYESTER FILAMENTS FOR SCREEN PRINTING

BACKGROUND OF THE INVENTION

The present invention relates to a mesh screen of polyester filaments for screen printing or, more particularly, to a mesh screen of polyester filaments for screen printing imparted with greatly improved adhesion with the layer of a photosensitive resin for patterning without decrease in the mechanical strength of the mesh screen.

Screen printing is a type of stencil printing using a patterned mesh screen as the printing screen. Thus, a mesh screen of fine filaments spread over a frame is coated with a photosensitive resinous composition to fill the meshes and the coating layer is exposed patternwise to light to cure the resin in the exposed areas followed by removing the resin composition from the unexposed areas to give a patterned printing screen composed of the areas of open meshes and areas of filled meshes. A printing ink is forced through the open meshes by means of a rubber roller and the like and transferred on to a material to be printed, e.g., paper, to complete the desired printing.

The filaments forming the mesh screen can be made of a variety of materials including silk, nylon, polyester, stainless steel and the like, of which polyester filaments are more and more preferred in recent years by virtue of the inexpensiveness and good recovery of elastic resilience.

Mesh screens made of polyester filaments are, however, not free from several problems. For example, the surface of a polyester filament is relatively smooth and has low affinity with water as compared to other materials above mentioned so that the adhesion of the photosensitive resin composition to the mesh screen is not always quite strong. This means that the photocured resinous coating layer may sometimes fall off the screen in the course of screen preparation and during use of the patterned mesh screen as a printing screen. This problem is particularly serious when the pattern formed on the screen is fine. Such a problem of falling of the resinous coating layer can occur in the development treatment after pattern-wise exposure of the coating layer to light or in the course of the printing works using the patterned screen in which the screen is cleaned by using an organic solvent or the screen is repeatedly subjected to a considerably large pressing action by a rubber-made squeezer which forces the printing ink through the open meshes of the patterned screen on to paper and the like.

Various attempts and proposals have been made hitherto to solve the above mentioned problem by the falling of the resinous layer including chemical treatments using various kinds of chemicals, flame treatment and so on. These prior art methods are not quite satisfactory in respect of the improvement thereby in the adhesion between the resinous coating layer and the polyester mesh filaments. Even worse, these prior art methods may sometimes cause an undue decrease in the mechanical strength of the filaments so that the mesh screen is subject to a danger of breaking in the spreading over a frame or during the printing works. For example, the mesh screen may be readily broken when it is contacted with a cornered body.

SUMMARY OF THE INVENTION

The present invention accordingly has an object to provide a mesh screen of polyester filaments for screen printing in which the adhesion between the filaments and the photosensitive resin composition is greatly improved without causing decrease in the mechanical strengths of the polyester filaments.

The mesh screen of polyester filaments for screen printing provided by the present invention as a result of the extensive investigations undertaken with the above mentioned object is a plain-woven mesh screen made of polyester filaments, the surface of each of the filaments having a crosslinked layer in a thickness of 0.001 to 0.1 $\mu$m and having tiny protrusions and concavities with a diameter in the range of 0.01 to 0.1 $\mu$m in a density in the range from 1000 to 6000 or, preferably, from 2000 to 4000 per $\mu m^2$ of the surface area.

Such a unique surface condition of the polyester filaments forming the mesh screen can be obtained by subjecting a mesh screen of polyester filaments to a treatment with low temperature plasma of an inorganic non-oxidizing gas under a pressure of 0.005 to 5 Torr.

DETAILED DESCRIPTION OF THE PREFERRED EMBODIMENTS

Figure 1:
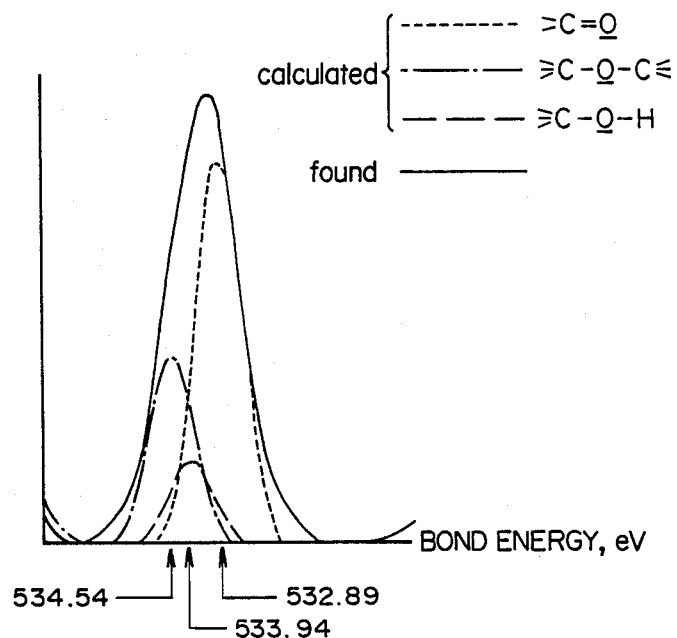
FIGS. 1 and 2 each show a spectrum of $O_{1s}$-ESCA (electron spectroscopy for chemical analysis) taken for the inventive and conventional mesh screens of polyester filaments, respectively.

As is described in the above given summary, the inventive mesh screen of polyester filaments for screen printing is characterized by the crosslinked surface layer of the polyester filaments having a specied thickness and the tiny protrusions and concavities distributed all over the surface of the polyester filaments.

The starting mesh screen of polyester filaments from which the above mentioned inventive mesh screen is prepared by a specific treatment may be a conventional screen plain-woven of polyester filaments having a diameter in the range from 10 to 400 $\mu$m in a fineness of 10 to 500 meshes per inch followed by scouring and heat-setting. The conditions for the low temperature plasma treatment of the mesh screen are described below.

The low temperature plasma treatment of the mesh screen of polyester filaments should be performed in an atmosphere of an inorganic non-oxidizing gas under a reduced pressure of 0.005 to 5 Torr. Thus, the starting mesh screen is held in a chamber for low temperature plasma generation capable of being evacuated and, while the above mentioned non-oxidizing inorganic gas is passed through the chamber keeping the specified reduced pressure inside the chamber, a high frequency electric power at a frequency of, for example, several kHz to several hundreds MHz is supplied between the electrodes so that low temperature plasma is generated inside the plasma chamber. The frequency band of the electric power is not limited to the above mentioned high frequency band but may be in the ranges of low frequency band, microwave band or direct current. In a preferable design of the plasma chamber, the electrodes should be installed inside the plasma chamber though not limited thereto. For example, the electrodes may be installed outside the plasma chamber or a single work coil surrounding the plasma chamber may work satisfactorily as connected to the high-frequency power source by the capacitive coupling or inductive coupling according to need. It is essential at any rate to avoid thermal denaturation of the surface of the polyester filaments by the heat of electric discharge.

Assuming that the electrodes are installed inside the plasma chamber according to the preferable design, the form of the electrodes is not particularly limitative. The grounded electrode and the power electrode may have the same configuration or may have a different configuration from each other in the form of, for example, a plate, ring, rod, cylinder and the like. In a preferable design of the plasma chamber, the walls of the chamber are made of a metal to serve as the grounded electrode. The power electrode is made usually of a metal such as copper, iron, aluminum and the like. It is preferable that at least the power electrode should be provided with an insulating coating of glass, porcelain enamel, ceramics and the like having a withstand voltage of 1000 volts or higher in order to maintain the electric discharge with stability. Insulation-coated rod-like electrodes are particularly preferable to obtain localized generation of effective plasma.

The electric power to be supplied between the electrodes should be controlled below a certain upper limit in order to avoid eventual decomposition or degradation of the polyester filaments by the heat of electric discharge for plasma generation. Though dependent on many factors, the electric power should not exceed 150 kilowatts per $m^2$ of the surface area of the power electrode or electrodes in this regard.

Various kinds of inorganic non-oxidizing gases can be used to support the low temperature plasma generation inside the plasma chamber including, for example, helium, neon, argon, hydrogen, nitrogen and the like. These gases can be used either singly or as a mixture of two kinds or more according to need.

The gaseous pressure inside the plasma chamber should be kept in the range from 0.005 to 5 Torr or, preferably, from 0.01 to 1 Torr. When the pressure is outside this range, the desired low temperature plasma can be generated with difficulties or with decreased stability or an excessively large quantity of heat may be produced to cause deteriorating thermal effects on the surface of the polyester filaments so that the protrusions and concavities formed by the low temperature plasma treatment may have an unduly large dimension resulting in a decrease in the mechanical strength of the filaments.

The length of time for the low temperature plasma treatment of the polyester filaments carried out under the above described conditions should not exceed 100 seconds. An unduly prolonged treatment of the filaments also may cause a decrease in the mechanical strength of the filaments. When the treatment time is extended to exceed 100 seconds, the thickness of the crosslinked layer on the filament surface may be unduly increased so that the mechanical strength of the filament may be decreased as a consequence of the brittleness of the crosslinked layer.

When the low temperature plasma treatment of the mesh screen of polyester filaments is performed under the above described conditions, the desired surface conditions are imparted to the polyester filaments including formation of a crosslinked hydrophilic layer having a thickness of 0.001 to 0.1 $\mu$m and formation of the tiny protrusions and concavities having a diameter of 0.01 to 0.1 $\mu$m distributed over the filament surface in a density in the range from 1000 to 6000 per $\mu m^2$ of the surface area of the filaments. The hydrophilic nature of the thus formed crosslinked surface layer can be supported by the measurement of the ESCA spectrum which indicates appearance of hydroxyl groups —OH and carboxyl groups —COOH on the surface of the polyester filaments after the low temperaturee plasma treatment.

The mesh screen of polyester filaments having the thus modified surface according to the invention is then coated with a photosensitive resin composition for patterning. Alternatively, a readyshaped film of a photosensitive resin composition is applied and bonded to the surface of the mesh screen for patterning. By virtue of the specific surface condition including the chemical nature of increased hydrophilicity and the roughened geometrical surface structure, the inventive mesh screen is imparted with greatly improved affinity to the photosensitive resin composition giving improved applicability thereof to the screen so that the layer of the photosensitive resin composition is absolutely free from pin holes which sometimes cause troubles in the use of a printing screen prepared by patterning a conventional mesh screen of polyester filaments. Further, in the bonding process of a pre-shaped film of a photosensitive resin composition to the mesh screen, for example, by using water as a wetting agent, water retention of the mesh screen is greatly improved as a consequence of the increased hydrophilicity of the filament surface so that the resin film can be bonded to the mesh screen more evenly than otherwise.

The inventive mesh screen thus provided with a layer of a photosensitive resin composition either by coating with a resinous coating composition or by bonding a pre-shaped resin film to the screen is then processed into a patterned printing screen in a known method including pattern-wise exposure to light through a patterned photomask and then developing using a developer liquid. As a consequence of the improved adhesion of the photosensitive resin composition and the mesh screen, the inventive mesh screen is suitable for patterning of an extreme fineness, for example, of a line pattern having a width of 30 $\mu$m or smaller without falling of any smallest bit of the resin layer off the screen. Further, the patterned printing screen prepared from the inventive mesh screen is imparted with greatly improved solvent resistance and durability in printing without decrease in the mechanical strength of the filaments so that the number of repeated printing using the printing screen can be much larger than with conventional printing screens. Moreover, the polyester filaments in the areas of open meshes after removal of the uncured photosensitive resin composition have improved surfaces to greatly facilitate transfer of a printing ink through the open meshes and splitting of the ink from the filament surface so that a beautiful and high-resolving printed matter absolutely without uninked spots can be obtained even by using a high-viscosity printing ink without clogging of the open meshes with the ink or ink scums. No problem due to pin holes in the resin layer is of course encountered in the printing works.

In the following, the mesh screen of polyester filaments for screen printing according to the invention is described in more detail by way of examples.

EXAMPLE 1

A mesh screen of polyester filaments having a fineness of 300 meshes per inch (Super Strong T No. 300S, a product by Nippon Tokushu Orimono Co.) was held in a plasma chamber and the atmosphere inside the chamber was reduced to 0.003 Torr. Helium gas was then passed through the plasma chamber at a constant rate so that the pressure inside the chamber was kept at 0.06 Torr in the steady state. While the atmospheric condition in the chamber was maintained as above, a high-frequency electric power at a frequency of 110 kHz was supplied for about 1 second between the electrodes in such a power input to give 10 kilowatts power per $m^2$ area of the power electrode.

The mesh screen of polyester filaments after the plasma treatment was examined by means of an electron microscope to find that a large number of protrusions and concavities having a diameter of 0.01 to 0.05 $\mu m$ had been formed on the surface in a distribution density of 2000 to 2500 per $\mu m^2$ of the surface area of the polyester filaments.

The thus obtained surface-modified mesh screen of polyester filaments was processed according to a known procedure into a test printing screen. Thus, the mesh screen was spread and coated with an emulsion-type photosensitive resin composition (Excel 53S, a product by Kurita Kagaku Kenkyusho Co.) in a coating thickness of 12 $\mu m$ as dried and exposed pattern-wise to light through a photomask having a checkerboard pattern having about 1600 squares of each 0.25 mm by 0.25 mm wide followed by a development treatment. The pattern-wise exposure to light was carried out for 1 minute using a high-pressure mercury lamp of 4 kilowatts output manufactured by Oak Seisakusho Co.

A pressure-sensitive adhesive tape (Paclon Tape Y683, a product by Sumitomo MMM Co.) was applied and bonded to the mesh screen thus patterned in a checkerboard by strongly rubbing with a finger tip and then rapidly peeled off to record the number of the square bits of the checkerboard-like patterned resin film lifted by adhering to the adhesive tape. The results obtained by repeating this test three times were that no square bits of the resin film were lifted at all in each of the repeated tests.

For comparison, the same testing procedure as above was repeated excepting omission of the low temperature plasma treatment of the starting mesh screen of polyester filaments to find that about 500, about 300 and about 300 square bits of the checkerboard-patterned resin film were lifted by adhering to the pressuresensitive adhesive tape in the first, second and third peeling tests, respectively.

The patterned mesh screens prepared with and without the low temperature plasma treatment were each subjected to the determination of the tensile strength and ultimate elongation according to the procedure specified in JIS L 1096 to give results that the tensile strengths were 27.8 kg and 27.5 kg and the elongations were 24.0% and 23.4% for the plasma-treated and untreated mesh screens, respectively, indicating that the low plasma treatment of the starting mesh screen had substantially no influences on the mechanical properties of the finished printing screens.

Further, each of the printing screens was spread and fixed to a printing frame of 56 cm by 56 cm outer dimensions under a tension corresponding to the value of 1.1 to 1.2 mm as measured by using a testing instrument (Model STG 75B, a product by Sun Gijutsu Kenkyusho Co.) and subjected to a tear test by piercing with a peg point to find no recognizable difference between the mesh screens tested.

COMPARATIVE EXAMPLE 1

The experimental procedure as in Example 1 was repeated except that the low plasma treatment of the starting mesh screen of polyester filaments was conducted for 30 seconds in an atmosphere of oxygen under a pressure of 2 Torr with supply of a high-frequency electric power of 100 kilowatts per $m^2$ of the surface area of the power electrode.

The electron microscopic examination of the thus plasma treated polyester filaments indicated that protrusions and concavities having a diameter of 0.1 to 0.5 $\mu m$ were found on the surface in a distribution density of 20 to 30 per $\mu m^2$ area of the filament surface. The test of the mechanical strength of a patterned printing screen prepared from the thus plasma-treated mesh screen gave results of the tensile strength of 20.5 kg, elongation of 21.2% and apparently decreased strength in the tear test leading to a conclusion that the mechanical properties of the screen were badly affected as compared to the comparative printing screen prepared without the low temperature plasma treatment of the starting mesh screen.

EXAMPLE 2

A mesh screen of polyester filaments having a fineness of 255 meshes per inch (SRT No. 255T white, a product by NBC Kogyo Co.) was held in a plasma chamber and the atmosphere inside the chamber was filled with argon gas under a pressure of 0.02 Torr. While the atmospheric condition in the chamber was maintained as above, a high-frequency electric power at a frequency of 110 kHz was supplied for 2 seconds between the electrodes in such a power input as to give a 20 kilowatts power per $m^2$ area of the power electrode.

The mesh screen of polyester filaments after the plasma treatment was examined by means of an electron microscope to find that a large number of protrusions and convavities having a diameter of 0.02 to 0.05 $\mu m$ had been formed on the surface in a distribution density of 2000 to 2300 per $\mu m^2$ of the surface area of the polyester filaments.

The thus plasma-treated mesh screen was tested for the ink transfer through the open meshes. Thus, the same photosensitive resin composition as used in Example 1 was applied to the mesh screen and photolithographically processed to form 10 square areas of open meshes each 10 mm by 10 mm wide in a similar manner to Example 1 and a printing test was undertaken by using the thus patterned printing screen with an electroconductive printing ink (Dotite FC-404, a product by Fujikura Kasei Co.) to prepare 100 sheets of the thus printed sheets. The weight increase in these printed sheets was determined as a measure of the improved ink transfer therethrough to give a value of 3.54 mg on an average per $cm^2$ of the area of the open meshes.

For comparison, the same experiment as above was repeated excepting omission of the low temperature plasma treatment to give a value of the ink transfer of 2.82 mg per $cm^2$ of the open meshes. This result clearly indicates that the inventive mesh screen prepared by undertaking the low temperature plasma treatment is substantially improved in respect of the decreased resistance against ink transfer therethrough.

EXAMPLE 3

A mesh screen of polyester filaments having a fineness of 305 meshes per inch (SRT No. 305T, a product by NBC Kogyo Co.) was held in a plasma chamber which was evacuated to have a pressure of 0.003 Torr. Then, the atmosphere inside the chamber was filled with argon gas under a pressure of 0.05 Torr. While the atmospheric condition in the chamber was maintained as above, a high-frequency electric power at a frequency of 110 kHz was supplied for about 2 seconds between the electrodes in such a power input as to give a 10 kilowatts power per $m^2$ area of the power electrode.

The polyester filaments of the thus plasma-treated mesh screen were examined for the surface condition by the osmium dyeing method using a transmission electron microscope to find that the surface layer of 0.07 to 0.09 $\mu$m thickness was dyed corresponding to a crosslinked layer. Such a dyed layer could not be detected on the surface of the polyester filaments before the low temperature plasma treatment.

Figure 2:
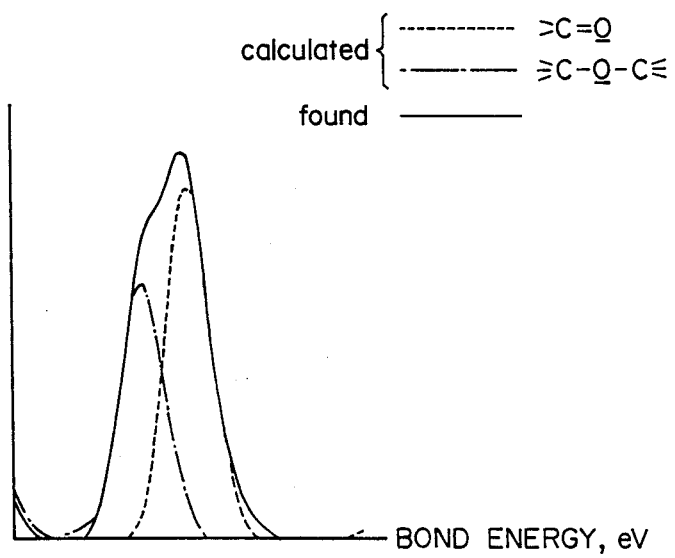

FIGS. 1 and 2 of the accompanying drawing each show a diagram obtained in the ESCA (electron spectroscopy for chemical analysis) method by $O_{1s}$ for the plasma-treated and untreated polyester filaments, respectively. Calculation for wave form resolution of the respective recorded peak shown by the solid line in the diagrams gave two or three isolated peaks which could be assigned to the oxygen atoms in the ether linkages (shown by a chain line), hydroxyl groups (shown by a broken line) and carboxyl groups (shown by a dotted line), respectively, by making reference to Table 3, Journal of Polymer Science, Chemical Edition, volume 14, page 1671 (1976). It is apparent from this study that hydroxyl groups could be detected in the plasma-treated polyester filaments while no hydroxyl groups could be detected in the same filaments before the plasma treatment.

The plasma-treated and untreated mesh screens were each processed to a test printing screen in just the same manner as in Example 1 except that the emulsion-type photosensitive resin composition was a different commercial product (Plus Print 399R-7, a product by Gooh Kagaku Kogyo Co.) and the exposure to ultraviolet light was performed for 2 minutes. The same tests as in Example 1 were performed with these printing screens leading to substantially the same conclusion as in Example 1.

COMPARATIVE EXAMPLE 2

The same mesh screen as in Example 3 was subjected to a low temperature plasma treatment under substantially the same conditions as in Example 3 except that the atmospheric gas for the plasma treatment was air under a pressure of 2 Torr, the electric power supply was 120 kilowatts per $m^2$ of the surface area of the power electrode and the duration of the treatment was 20 seconds.

The electron microscopic examination of the thus plasma-treated filaments indicated that the thickness of the crosslinked surface layer was about 0.2 $\mu$m. The plasma-treated mesh screen had a tensile strength of 19.5 kg and elongation of 22.0% to show considerable decreases from the values of 27.6 kg and 23.0%, respectively, obtained with the mesh screen before the low temperature plasma treatment. The resistance against tear was also apparently decreased by the plasma treatment.

EXAMPLE 4

A mesh screen of polyester filaments having a fineness of 270 meshes per inch (Super Strong T No. 270T, yellow, a product by Nippon Tokushu Orimono Co.) was held in a plasma chamber and the atmosphere inside the chamber was filled with helium gas under a pressure of 0.02 Torr. While the atmospheric condition in the chamber was maintained as above, a high-frequency electric power at a frequency of 110 kHz was supplied for 2 seconds between the electrodes in such a power input as to give a 25 kilowatts power per $m^2$ area of the power electrode.

The polyester filaments of the thus plasma-treated mesh screen was examined electron microscopically to find a crosslinked surface layer having a thickness of about 0.005 to 0.01 $\mu$m. Appearance of hydroxyl groups was noted by the ESCA method carried out in the same manner as in Example 3.

The mesh screens before and after the plasma treatment were each subjected to the ink transfer test in the same manner as in Example 2 except that the test ink was an electroconductive ink of a different grade (Dotite FA-303, a product by Fujikura Kasei Co.). The results were that the amounts of ink transfer through the screen were 5.05 and 6.10 mg per $cm^2$ areas of the open meshes in the screens prepared without or with the low temperature plasma treatment, respectively, to give a conclusion that the resistance of the screen against ink transfer could be substantially decreased by the plasma treatment.

What is claimed is:

1. A mesh screen of polyester filaments for screen printing which is a plain-woven mesh screen made of polyester filaments, the surface of each of the filaments having a crosslinked layer in a thickness of 0.001 to 0.1 $\mu$m and having tiny protrusions and concavities with a diameter in the range from 0.01 to 0.1 $\mu$m in a density in the range from 1000 to 6000 per $\mu m^2$ of the surface area.

2. A method for the improvement of a mesh screen of polyester filaments for screen printing in respect of the adhesion between the filament surface and a photosensitive resin composition to be applied to the mesh screen for photolithographic patterning and in respect of the resistance of the mesh screen against transfer of a printing ink, which comprises subjecting the mesh screen to exposure to low temperature plasma generated in an atmosphere of a non-oxidizing inorganic gas under a pressure in the range from 0.005 to 5 Torr to such an extent that a crosslinked layer having a thickness of 0.001 to 0.1 $\mu$m is formed on the surface of the polyester filaments and the surface of the filaments is provided with protrusions and concavities having a diameter of 0.01 to 0.1 $\mu$m in a distribution density of 1000 to 6000 per $\mu m^2$ of the surface area of the filament.

* * * * *